US006036170A

United States Patent [19]

Pitocco

[11] Patent Number: 6,036,170

[45] Date of Patent: Mar. 14, 2000

[54] SERVICE VALVE HEADS WHICH MAY BE CONNECTED TO SOFT DRINK BOTTLES OR THE LIKE

[75] Inventor: Roberto Jose Pitocco, Banfield, Argentina

[73] Assignee: Sides S.A., Argentina

[21] Appl. No.: 09/135,133

[22] Filed: Aug. 17, 1998

[30] Foreign Application Priority Data

Oct. 31, 1997 [AR] Argentina ...................... P97 01 05091

[51] Int. Cl.[7] ............................ F16K 31/60; F16K 35/00

[52] U.S. Cl. ................................ 251/99; 16/429; 74/543; 222/153.14; 251/243; 251/244

[58] Field of Search ................................ 251/95, 98, 99, 251/242, 243, 244, 245, 246; 16/110.1, 429; 74/543, 547; 222/153.14, 509

[56] References Cited

U.S. PATENT DOCUMENTS

| | | | |
|---|---|---|---|
| 990,179 | 4/1911 | Wilson et al. | 251/243 |
| 2,127,860 | 8/1938 | Davis, Jr. | 251/243 |
| 2,344,219 | 3/1944 | Smith | 251/243 |
| 3,311,128 | 3/1967 | Taylor | 251/98 |
| 3,313,516 | 4/1967 | Peterson | 251/243 |

FOREIGN PATENT DOCUMENTS

| | | | |
|---|---|---|---|
| 0021885 | 1/1981 | European Pat. Off. | 251/98 |

*Primary Examiner*—George L. Walton

*Attorney, Agent, or Firm*—Bachman & LaPointe, P.C.

[57] ABSTRACT

Improvements in service valve heads which may be connected to soft drink bottles or the like, wherein a valve body is obtained, a liquid circulation channel being provided between the spout and the fishing tube, said channel having a check valve. The rod of said valve is actuated by a command means whose the articulated arm is foldable over the valve body, having folding stops and having a strap provided with a retainer. Folding stops of the valve body and corresponding recesses of the articulated arm prevent that the latter being lowered by any accidental pressure, in which case the valve rod would be displaced and an unwanted release of liquid would be produced. For delivering the carbonated liquid it is first necessary to release the folding strap. In this way the articulated arm may be unfolded until it displaces through the command channel existing on the head walls.

7 Claims, 2 Drawing Sheets

SERVICE VALVE HEADS WHICH MAY BE CONNECTED TO SOFT DRINK BOTTLES OR THE LIKE

FIELD OF THE INVENTION

The instant invention relates to improvements in service valve heads, which may be connected to soft drinks bottles or the like, preventing accidental operation of the command means and avoiding use of the bottle prior to its delivery to the user.

BACKGROUND OF THE INVENTION —PRIOR ART

Usually, one of the most popular soft drinks is carbonated water supplied into bottles with service valve heads. A valve body crossed by a circulation channel that ends at one end in a service outer spout and at the other ends into a fishing tube located inside the bottle basically comprises these valve heads. A valve is interposed into this circulation channel, this valve being actuated by a lever projecting outwardly to the valve head.

From this basic configuration, the improvements developed have been mainly directed to avoid gas or liquid losses by improving the valves and their forming elements, such as valve seat, valve rod, plug, etc. However, most of known heads still have a rigid outer actuator lever.

The disadvantage of the above mentioned lever is that in the travel from the manufacturing plant and the user siphons are successively loaded and unloaded in different occasions. These operating movements often cause involuntary operation of driving levers, this resulting in gas and liquid losses, also causing damages in the valve mechanism then preventing normal operation.

SUMMARY OF THE INVENTION

The improvements introduced by the instant invention overcome all the mentioned inconveniences since, based on some basic constitutive means, such as a valve body having a liquid circulation channel between the spout and the fishing tube, this channel having a check valve, a new combination of means is introduced which avoids the mentioned disadvantages. Therefore, the valve rod is actuated by a command means the articulated arm of which may be folded over the valve body, wherein folding stops and a strap provided with a retainer are included.

Said stops prevent that any accidental pressure, in which case the valve rod would be shifted, press the foldable articulated arm and an unwanted release of liquid would take place. Therefore, frequent shocks and pressures during delivery and storage are not able to actuate the command means which is fitted on the stops and further held by the strap.

Further, the folding strap also makes the user sure that the siphon has not been opened by third parties, thus maintaining the responsibility of the manufacturer and the supplier regarding the quality and hygienic conditions of the contents. Also, the inclusion of a second strap has been provided at the base of the valve body, as a safety means at the region coupling the head with the bottle.

Also, at the base of the valve body, but in this case at its lower portion, the head walls form a region having a tight joint with the spout of the container bottle. This joining region is comprised by a conical inner boss which, forming part of the head, does not require complementary joints as in conventional heads.

Finally, the simple construction of the instant valve head is to be highlighted. In fact, resilient means such as independent springs of the command lever are eliminated. This is effected by a driving means from the main body of which a set of elongated resilient members project. Further, although the connection to the valve rod retains said command means, the arrangement of articulated arm stops is used as complementary retention means.

In fact, due to the maximum constructive simplicity and functional capacity of the head, manufacturing costs are reduced and efficiency of the head is increased. Therefore, the use of the head of the invention has been foreseen for disposable units.

BRIEF DESCRIPTION OF THE DRAWINGS

The invention will be now described in connection with the following drawings, which are only exemplary embodiments, which do not limit the scope of protection.

In the FIGURES, the same reference numerals designate the same or equivalent parts, and the assemblies of several elements have been designated with letters. List of the main references.

Figure 1:
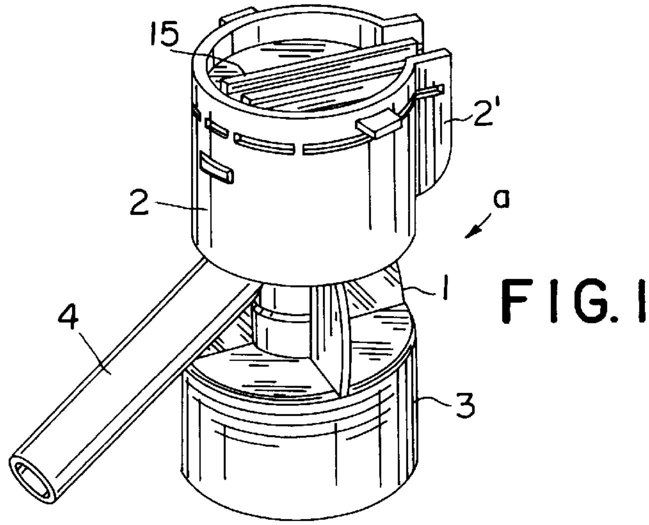
FIG. 1 is a perspective view showing the general shape of the valve head of the instant invention, with the command means folded and secured by a folding strap.

(a) valve head
(b) container bottle
(c) command means
(d) check valve
(1) valve body
(1')inner wall of the valve body (1)
(1")shifting guide of the valve (d) rod (10)
(2) head walls of the valve body (1)
(2') command channel
(3) base walls of the valve body (1)
(4) head (a) spout
(5) head of the container bottle (b)
(6) fishing tube
(7) liquid circulation channel
(7') outlet of channel (7) into the fishing tube
(8) valve head at the circulation channel (7)
(9) valve plug of the check valve (d)
(10) check valve (d) rod
(10') rod (10) end
(11) head end of the valve body (1)
(12) main body of the command means (c)
(12') supporting articulation
(13) retainer fit of the main body (12) for the end (10')
(14) folding stops of the articulated arm (15)
(15) foldable articulated arm
(15') articulation defined by the hinged section narrowing
(16) end of the foldable articulated arm (15)

(17) folding strap
(18) retaining opening
(19) resilient elongated members [resilient compression means]
(20) recesses of the foldable articulated arm for stops (14)
(21) coupling strap
(22) tight fit conical region.

DETAILED DESCRIPTION OF THE INVENTION

The improvements in service valve heads (a), which may be connected to soft drink bottles (b) or the like, of the type in which the head (a) may be coupled to the neck (5) of a bottle (b) containing carbonated liquid, include:

a) a valve body (1) crossed by a liquid circulation channel (7) communicating with an outer spout (4) with the inner outlet (7') into a fishing tube (6) which ends inside the bottle (b);

b) a check valve (d) which, mounted in said circulation channel (7), has a valve plug (9) normally closed, the rod of which (10) has a shifting guide (1") in an inner wall (1') of said valve body (1);

said improvement characterized by comprising:

c) a command means (c) which, connected to said valve plug (9) and articulated (12') at the head walls (2) of said valve body (1), constitutes a second genus lever the resistance of which is afforded by a compression resilient means (19), while the power is afforded by an articulated arm (15), foldable within the limits of said head walls (2).

d) at least a shoulder set which, shaped at the head walls (2), constitute folding stops (14) of said articulated arm (15) on the valve body (1); and e) strap means comprising a folding strap (17) of said articulated arm (15).

In general, the improvement of the instant invention results in a valve body (1) having a liquid circulation channel between the spout (4) and the fishing tube (6), said channel having a check valve (d). Rod (10) of said valve (d) is actuated by a command means (c) whose articulated arm (15) is foldable on the valve body (1), wherein folding stops (14) are included and having a strap (17) provided with a retainer (18). [See FIGS. 1 and 3]

More particularly, the valve head (a) of the invention comprises a valve body (1) constituted by upper head walls (2) and lower base walls (3). Inside the latter (3) a coupling is defined which includes a conical region (22) having tight fit with the neck (5) of a bottle (b) containing carbonated liquid.

At the side, the valve body (1) forms an outer service spout (4) communicating with a fishing tube (6) situated inside the bottle (b) by means of a carbonated liquid circulating channel (7). Within the valve body (1), the circulation channel (7) communicates the end of said spout (4) with an outlet (7') of the fishing tube (6). [FIGS. 4 and 5]

In this circulation channel (7) there is a check valve (d), in such a way that its plug (9) is normally closed against a valve seat (8) formed by the circulation channel (7) per se.

Above the circulation channel (7) and the valve seat (8), the valve body (1) forms an inner wall (1') provided with a shifting guide (1") of the check valve rod (10). The rod (10) ascends vertically and ends at an end (10") which is connected to retention fit (13) of the command means (c) [FIGS. 4 and 5].

Figure 2:
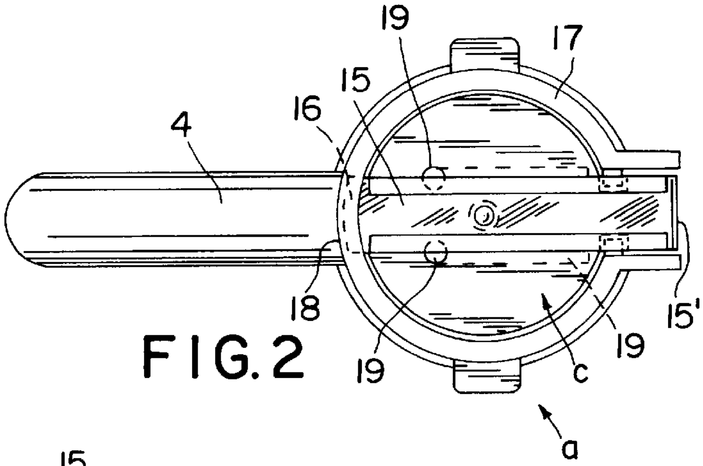
FIG. 2 is a top view in which the way the articulated arm is folded against the main body of the command means. Also, the way in which the end of said arm is retained by the folding strap is shown.

Said command means (c) has a main body (12) having a shape corresponding to the upper portion of the valve body (1) within which it is housed. At one of its ends, said main body (12) defines a supporting articulation (12'), while at the opposite end said body (12) forms a foldable articulated arm (15), within the limits imposed by the head walls (2) of said valve body (1). [FIGS. 2 and 3].

Figure 4:
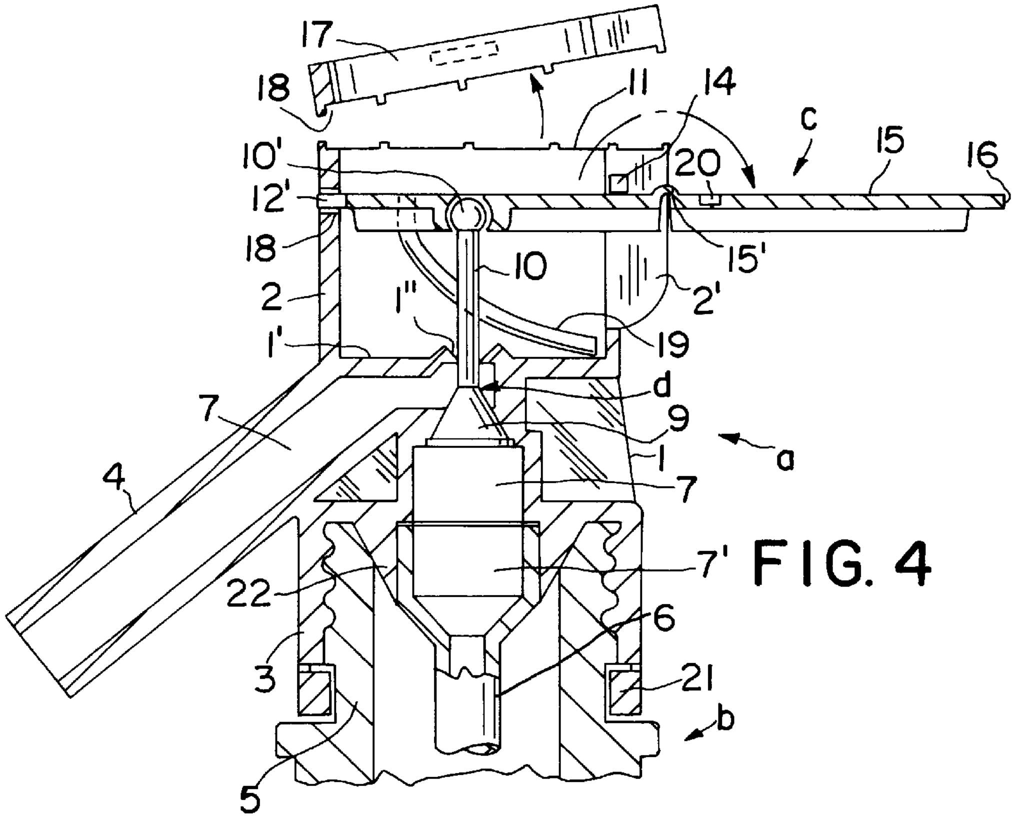
FIG. 4 is a longitudinal section showing the folding strap release and unfolding of the articulated arm forming the command means. Also, the elongated resilient members are shown.
Figure 5:
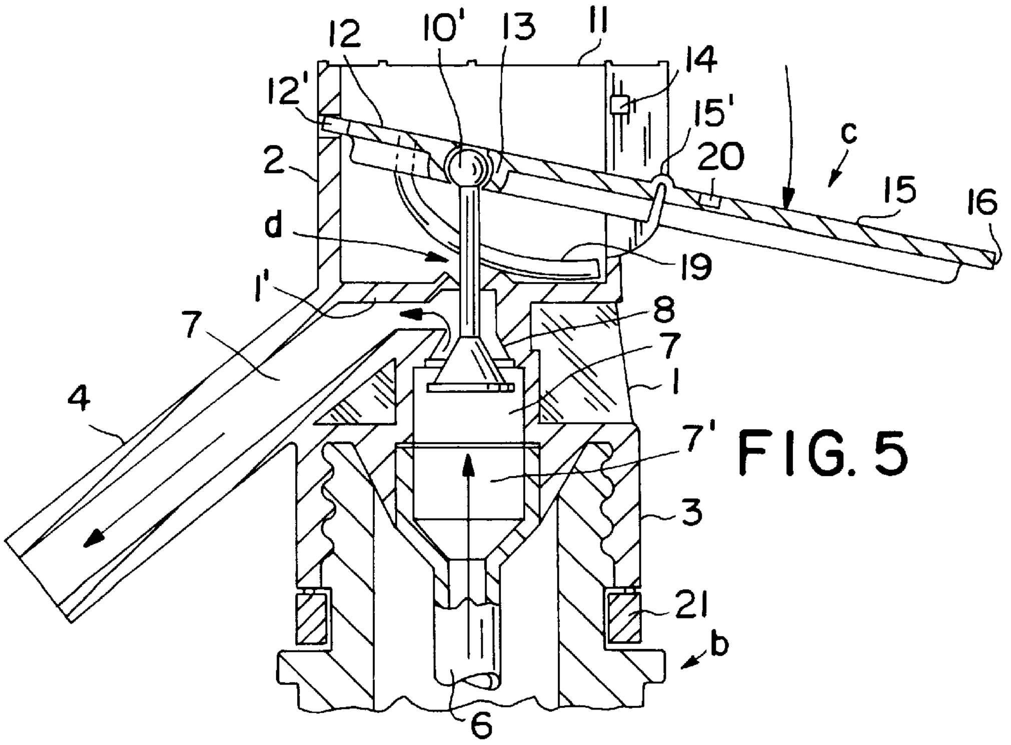
FIG. 5 is a longitudinal section as that of FIG. 4, but in this case showing the articulated arm descending through the command channel and opening the check valve.

At its lower portion, the main body (12) of the command means (c) has said retention fit (13) for end (10') of rod (10) and, further, it has a compression resilient means comprised by a set of elongated members (19) projecting downwardly, which are resiliently compressed between said command means (c) and the inner wall (1') of the valve body (1). [FIGS. 4 and 5].

Due to the shape and arrangement of the command means (c), such means constitutes a second genus lever the resistance of which is afforded by the elongated resilient members (19) and the power of which is afforded by the foldable articulated arms (15).

Figure 3:
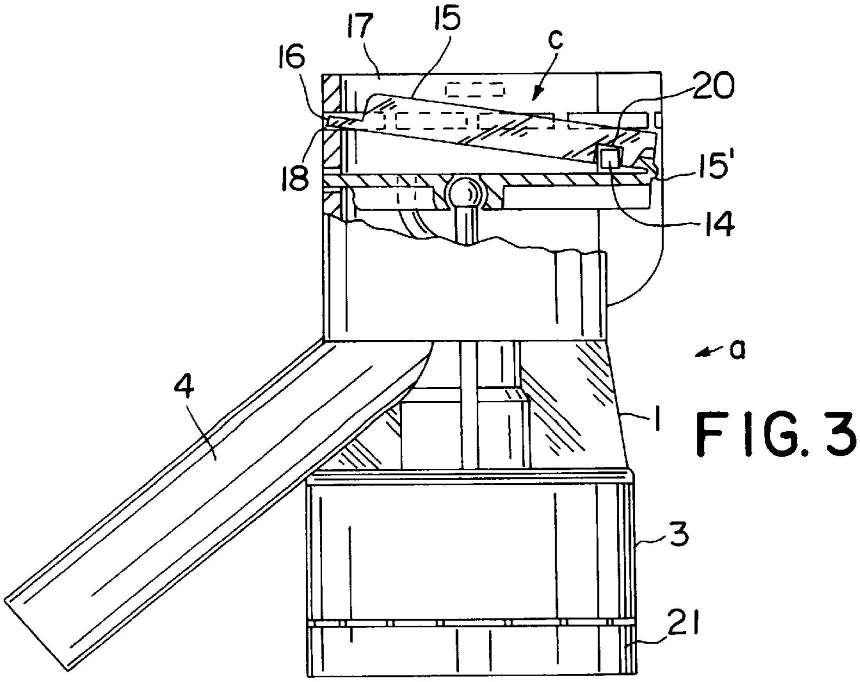
FIG. 3 is a partial longitudinal section in a side view showing the way in which folding of the articulated arm is limited by the folding tops fitted at their recesses.

In this embodiment, the command means (15) is made of plastic material, while the foldable articulated arm articulation (15) is defined by a hinged sectional narrowing (15'). [See FIGS. 3, 4 and 5].

On the head end (11) of the valve body (1) there is a folding strap (17) comprised by a releasable annular strip forming a retaining opening (18) for the end (16) of the foldable articulated arm (15). [FIG. 4].

Further, head walls (2) have on their inner face a set of shoulders which, apart from retaining the command means (c) inside the valve body (1), comprise folding stops (14) for the foldable articulated arm (15). In turn, the latter (15) has corresponding recesses (20) into which said folding stops fit (14).

In other embodiments, the strap means include a coupling strap (21) between the base walls (3) of the valve body (1) and the neck (5) of the bottle (b). [FIG. 5].

The assembly operates as follows:

The presence of the hinged sectional narrowing (15') or articulation allows folding of the articulated arm (15) against the main body (1) of the command means (c) . In this position it is retained by the folding strap (17) by means of the retention opening (18) into which the end (16) of said articulated arm (15) fits. [FIG. 3].

Besides, folding stops (14) of the valve body (1) and corresponding recesses (20) of the articulated arm (15) prevent that the arm (15) be lowered due to any accidental pressure, in which case rod (10) of valve (d) would be displaced and an unwanted release of liquid would take place. [See FIG. 3].

Therefore, in order to deliver the carbonated liquid, it is required, in the first place, to release the folding strap (17). In this way, the articulated arm may be stretched until it displaces through the command channel (2') existing between the head walls (2). Under such conditions, once the resistance of resilient members (19) is overcome, the valve plug (9) displaces and liquid circulates through the corresponding channel (7) until it exists through spout (4) of head (a). [FIG. 5].

Those skilled in the art may introduce many alternatives and modifications without departing from the basic principles contained in the annexed claims.

I claim:

1. Improvements in service valve heads, which may be connected to soft drink bottles or the like, of the type in which the head may be coupled to the neck of a bottle containing carbonated liquid, include:

a) a valve body crossed by a liquid circulation channel communicating with an outer spout with the inner outlet into a fishing tube which ends inside the bottle;

b) a check valve which, mounted in said circulation channel, has a valve plug normally closed, the rod of which has a shifting guide in an inner wall of said valve body;

comprising:

c) a command means which, connected to said valve plug and articulated at the head walls of said valve body, constitutes a second genus lever the resistance of which is afforded by a compression resilient means, while the power is afforded by an articulated arm, foldable on the valve body within the limits of said head walls;

d) at least a set of shoulders which, shaped at the head walls, constitute folding stops of said articulated arm on the valve body; and e) strap means comprising a folding strap of said articulated arm, whereby release of the strap means enables articulation of the articulated arm.

2. Improvements in service valve heads, which may be connected to soft drink bottles or the like, as claimed in claim 1, wherein the compression resilient means comprises a set of elongated members which, projected from the inner face of the command means, are resiliently compressed between said command means and the inner wall.

3. Improvements in service valve heads, which may be connected to soft drink bottles or the like, as claimed in claim 1, wherein in its interior, the valve body is shaped as a cone that, being located at the coupling region with the bottle neck, constitutes a tight fit between the valve head and said bottle.

4. Improvements in service valve heads, which may be connected to soft drink bottles or the like, as claimed in claim 1, wherein the command means is made of plastic material, while the articulated arm is defined by a hinged sectional narrowing.

5. Improvements in service valve heads, which may be connected to soft drink bottles or the like, as claimed in claim 1, wherein the folding strap is comprised by a releasable annular strip which, being at the head end of the valve body, constitutes a retainer for the foldable articulated arm end.

6. Improvements in service valve heads, which may be connected to soft drink bottles or the like, as claimed in claim 1, wherein said strap means include a coupling strap between the valve body and the bottle neck.

7. Improvements in service valve heads, which may be connected to soft drink bottles or the like, as claimed in claim 1, wherein the command means constitutes a retention fit into which the end of the plug rod is connected.

* * * * *